(12) United States Patent
Zajac

(10) Patent No.: US 6,185,959 B1
(45) Date of Patent: Feb. 13, 2001

(54) REFRIGERANT SYSTEM COMPONENTS WITH CARTRIDGE TYPE THERMAL EXPANSION VALVE AND METHOD OF MAKING SAME

(75) Inventor: Christopher A. Zajac, Macomb Township, MI (US)

(73) Assignee: Eaton Corporation, Cleveland, OH (US)

( * ) Notice: Under 35 U.S.C. 154(b), the term of this patent shall be extended for 0 days.

(21) Appl. No.: 09/288,991

(22) Filed: Apr. 9, 1999

(51) Int. Cl.⁷ ...................................................... F25B 41/06
(52) U.S. Cl. ................................................ 62/527; 62/475
(58) Field of Search ............................. 62/527, 503, 504, 62/509, 475

(56) References Cited

U.S. PATENT DOCUMENTS

| | | | |
|---|---|---|---|
| 3,525,234 | * | 8/1970 | Widdowson ............................. 62/217 |
| 3,962,884 | * | 6/1976 | Widdowson ............................. 62/217 |
| 3,965,693 | * | 6/1976 | Widdowson ............................. 62/217 |
| 4,756,166 | * | 7/1988 | Tomasov ................................. 62/509 |
| 5,331,827 | * | 7/1994 | Chelbak ................................. 62/509 |
| 5,454,233 | * | 10/1995 | Naujock ................................. 62/509 |
| 5,515,696 | * | 5/1996 | Hutchison ............................. 62/509 |
| 5,799,499 | * | 9/1998 | Yano et al. ............................ 62/225 |

* cited by examiner

*Primary Examiner*—William Doerrler
*Assistant Examiner*—Mel Jones
(74) *Attorney, Agent, or Firm*—Roger A. Johnston

(57) ABSTRACT

A filter/drier has, in one embodiment, an expansion valve block formed integrally with a header welded to a desiccant-containing canister. The block has a bore into which is received a precalibrated thermally responsive cartridge valve after the welding operations to prevent exposure of the cartridge valve to the elevated temperatures experienced during welding. In another embodiment, a valve block has one end of a first conduit welded to the high pressure inlet port and one end of a second conduit welded to the low pressure discharge port. A cartridge type thermally responsive precalibrated expansion valve is assembled in a block bore after welding is completed to prevent the expansion valve from being exposed to elevate temperatures experienced during welding.

21 Claims, 7 Drawing Sheets

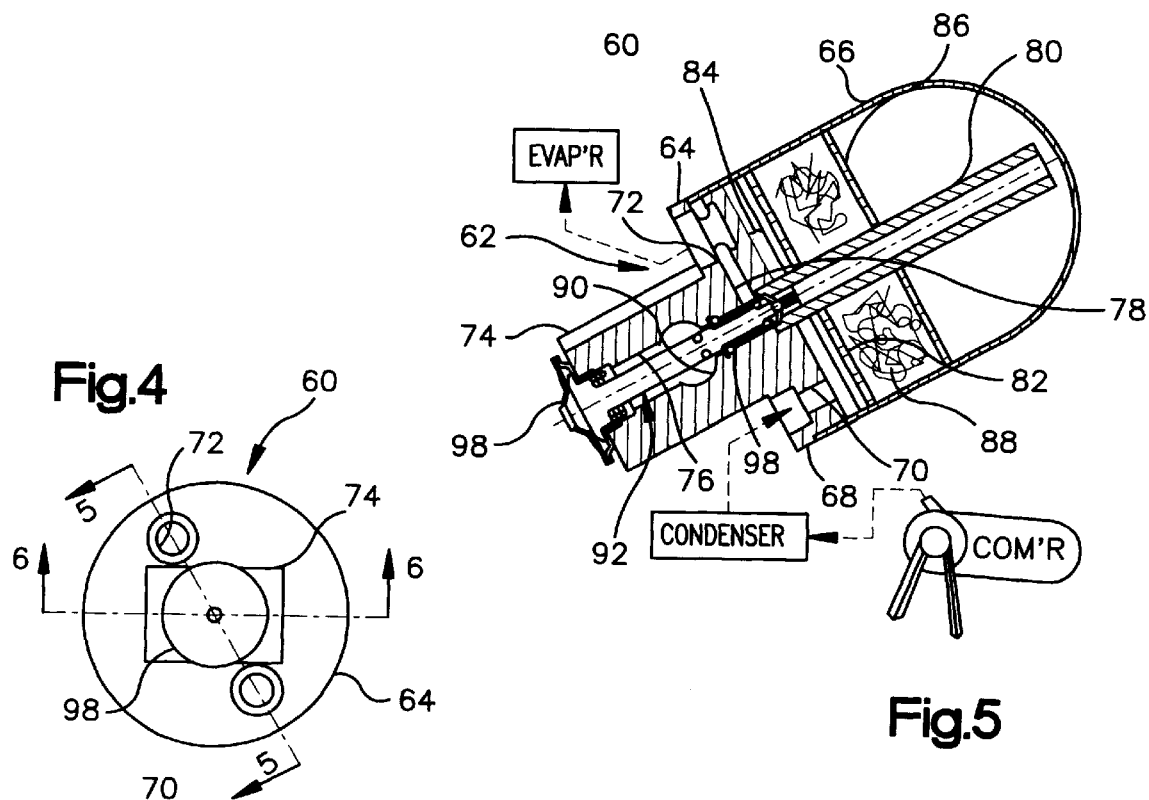
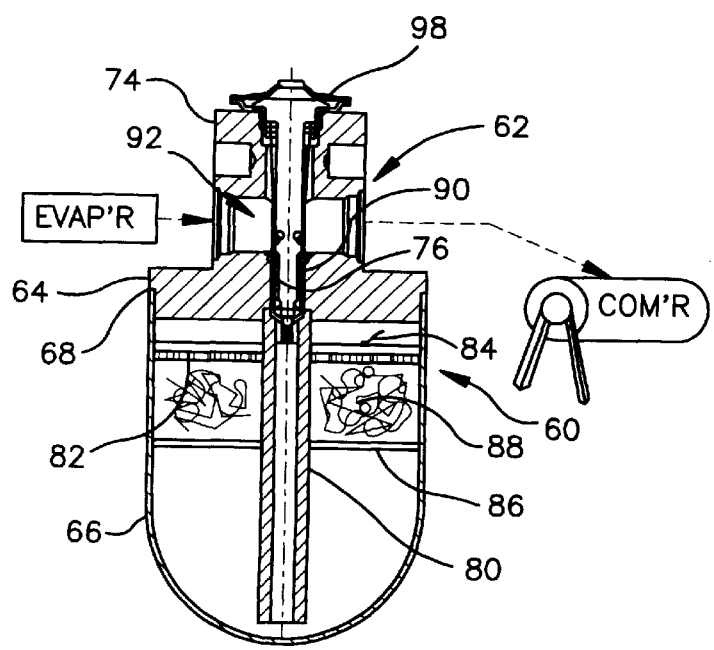

REFRIGERANT SYSTEM COMPONENTS WITH CARTRIDGE TYPE THERMAL EXPANSION VALVE AND METHOD OF MAKING SAME

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

The present invention relates to refrigerant systems of the type circulating high pressure refrigerant from a compressor through a condenser and expansion device, such as a thermal expansion valve, to an evaporator for absorption of heat vaporization and return to the compressor inlet. The present invention relates particularly to such refrigerant systems employed for air conditioning the passenger compartment of a motor vehicle.

In the design and manufacture of air conditioning systems for motor vehicles, it has been found difficult to provide suitable conduit connections between the various system components such as the evaporator, condenser and compressor during final assembly of the vehicle particularly in high volume, mass production, as is the case for passenger cars and light truck vehicles. In mass production of such systems, problems have been encountered with leakage of the refrigerant, particularly on the high pressure side of the system between the compressor and the expansion device.

In mass production of motor vehicles with air conditioning systems, it is desired to have quick-connect type fittings for attachment of the hoses and tubes to compressor, condenser and evaporator in order to eliminate the need for the use of tools and time consuming operations during assembly to thereby minimize the manufacturing costs of the vehicle. Heretofore, automotive air conditioning systems employing block type thermal expansion valves as the expansion device have utilized ported header blocks with the tubes welded or mechanically attached thereto prior to assembly, which blocks are subsequently attached to the expansion valve body with o-ring seals about the ports. This type of connection requires mechanical fasteners such as bolts threaded into the valve block for attachment of the header block thereto; and, can be extremely difficult to attach when the expansion valve is located near the engine compartment bulkhead or fire wall. This location for the expansion valve is often chosen to shorten the length of conduits between the expansion device and the evaporator or endothermic heat exchanger located within the passenger compartment. In many passenger and light truck motor vehicles it is difficult for personnel on the vehicle assembly line to attach the conduits to the expansion valve because of tight clearances between the surrounding vehicle components within the engine compartment.

Thus, it has been desired to provide a way or means of connecting vehicle air conditioning system conduits to an expansion valve and providing for mounting of the expansion valve in such a manner as to reduce the cost of the system assembly in vehicle production, to render the assembly operations easily accessible by the vehicle assembly personnel and to provide for seal integrity of the refrigerant circulating through the system.

BRIEF SUMMARY OF THE INVENTION

The present invention provides a way or means of reducing the number of conduit connections between the various system components in a refrigeration system, particularly an air conditioning system for the passenger compartment of a motor vehicle where the compressor is mounted on the vehicle engine and the evaporator is mounted within the passenger compartment.

The present invention provides for a motor vehicle air conditioning system employing a thermal expansion valve for controlling flow of the refrigerant from the condenser to the evaporator and provides for improved connections between the thermal expansion valve and the remaining system components such as the compressor, condenser and evaporator.

The present invention provides a pre-assembled, precalibrated thermal expansion valve cartridge which is assembled into a valve block after attachments of conduits to the valve block thereby permitting attachment of such conduits to the block by weldment.

The present invention provides in one embodiment, the valve block of the thermal expansion valve formed integrally with the header of a filter/drier and may have the condenser line connection and the evaporator line connection formed through the header, with a flow-through passage from the evaporator to the compressor inlet formed through the valve block, or alternatively may have all four ports formed directly in the valve block. In another embodiment, the valve block has one end of a metal tube for connection to the condenser attached to the valve block by weldment; and, one end of a tube for connection to the compressor inlet attached to the valve block by weldment. This arrangement thus allows attachment of the tubes by welding and assembly of the precalibrated cartridge valve into the valve block after weldment thereby eliminating exposure of the thermal expansion valve to the elevated temperatures experienced during welding.

The present invention thus provides a unique and novel technique for installing a thermal expansion valve in an air conditioning system for a motor vehicle in a manner which improves the integrity of the refrigerant line seals, reduces the number of connections and minimizes the manufacturing costs.

BRIEF DESCRIPTION OF THE DRAWINGS

FIG. 4 is a top view of another embodiment of a filter/drier having an integral cartridge-type thermal expansion valve;

FIG. 5 is a section view taken along section indicating lines 5—5 of FIG. 4 and indicates in dashed outline the system component connections to the evaporator and condenser of the system;

FIG. 6 is a section view taken along section-indicating lines 6—6 of FIG. 4 and shows in dashed outline the connection to the evaporator outlet and compressor inlet;

DETAILED DESCRIPTION OF THE INVENTION

Figure 2:
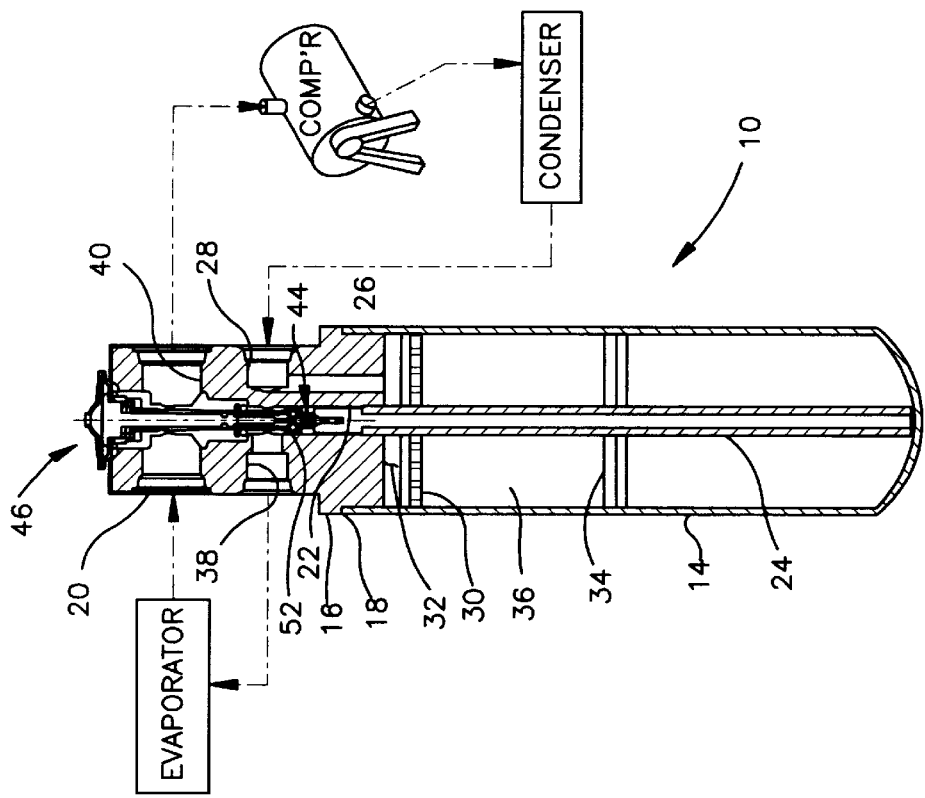
FIG. 2 is a section view taken along section indicating lines 2—2 of FIG. 1 and indicates in dashed outline the system connections to the ports of the device of FIG. 1.
Figure 1:
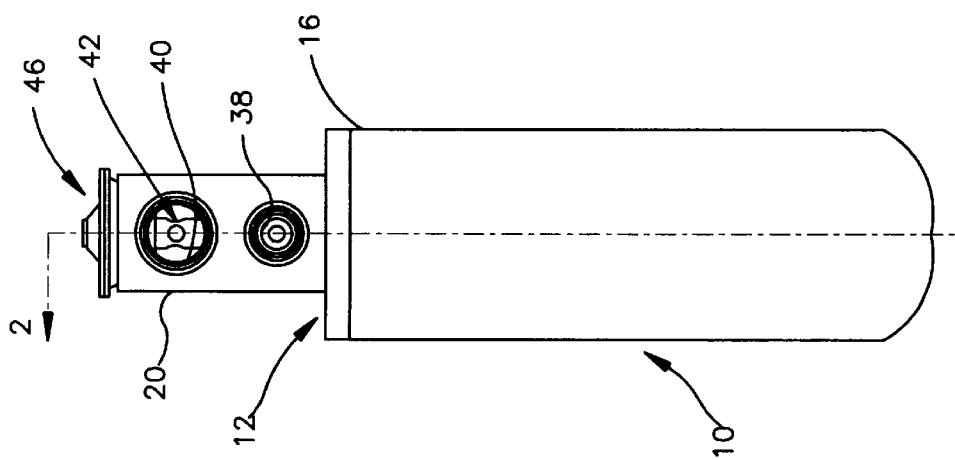
FIG. 1 is a side elevation view of a filter/drier having a cartridge-type thermal expansion valve formed integrally with the header thereof.
Figure 3:
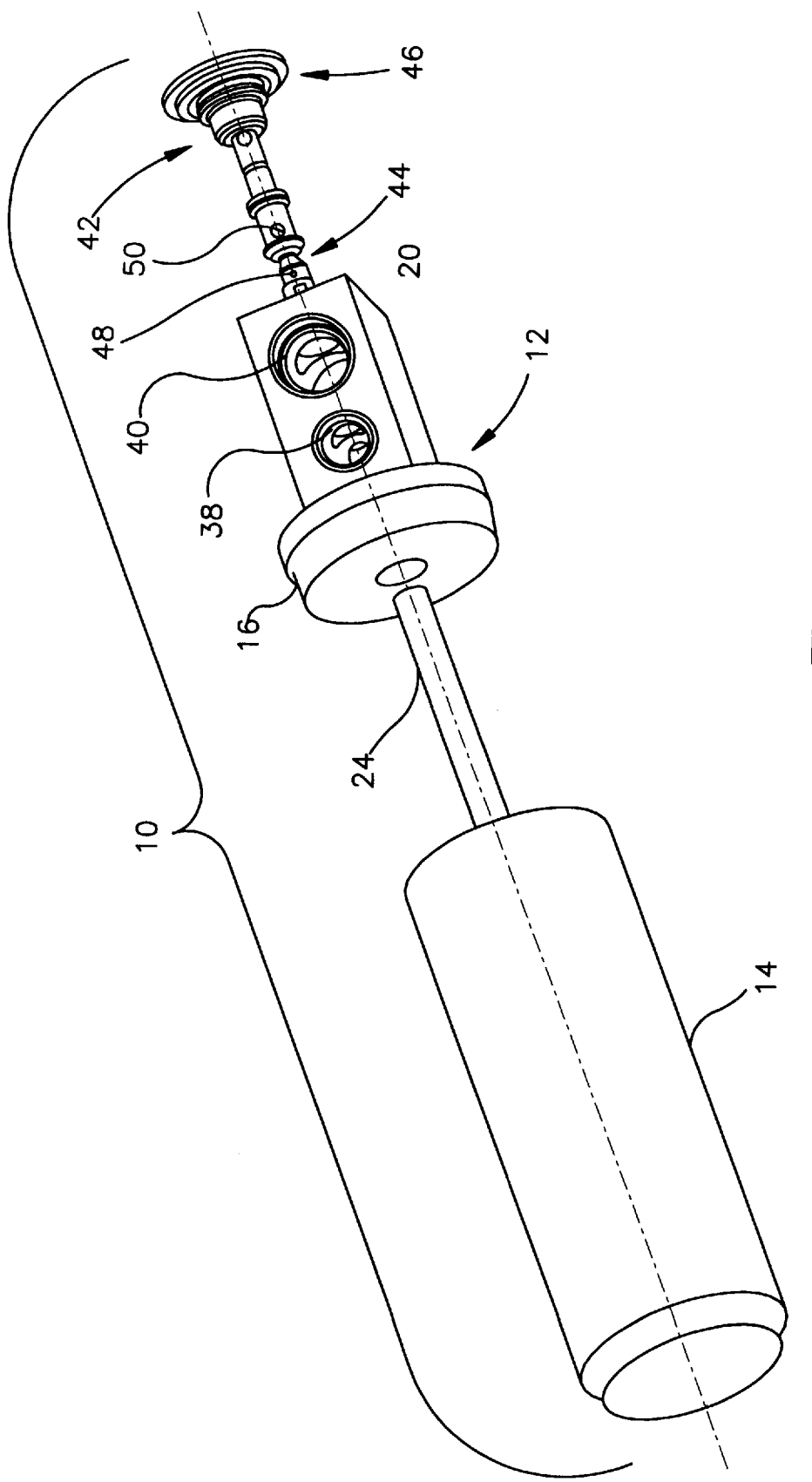
FIG. 3 is an exploded view of the device of FIG. 1.

Referring to FIGS. 1 through 3, the invention is illustrated generally at 10 as embodied in a filter/drier for a refrigeration system, such as employed in a motor vehicle passenger compartment air conditioning system, and has a combination valve block and header indicated generally at 12 which is attached to a canister or shell 14 which in the present practice of the invention comprises a closed end member with the open end secured over the header portion 16 and secured thereon in any suitable fluid pressure sealing manner, as for example, peripheral weldment as denoted by reference numeral 18.

The upper portion of the combination block and header 12 comprises a valve body or valve block portion 20.

The header portion 16 and valve body portion 20 have formed continuously therethrough a central bore 22 which has received and secured therein, such as by press fit, one end of a standpipe 24 which has its lower end base closely adjacent the closed end or bottom of the canister 14. The header portion 16 also has an inlet passage 26 formed therein which opens to the interior of the canister at its lower end and communicates at its upper end with a low pressure inlet port 28 formed in the block portion 20. Inlet port 28 is adapted to be connected to a conduit to receive refrigerant at relatively high pressures from a condenser as indicated by the dashed outline in FIG. 2.

Canister 14 has a baffle or porous partition 30 provided therein through which the standpipe 24 passes; and, the partition 30 includes screen material or perforated metal to form a plenum chamber 32 adjacent the undersurface of header portion 16 for receiving refrigerant from the inlet passage 26 and distributing same over the surface of the porous partition 30.

A lower baffle or porous partition 34 is disposed spaced from the upper partition 30; and, partition 34 forms a chamber between partition 34 and partition 30 chamber which is filled with suitable desiccant and/or filtering material as denoted by reference numeral 36.

Block portion 20 also has a relatively low pressure discharge or outlet port 38 formed therein and disposed coaxially on the opposite side of the block as inlet port 28; and, outlet port 38 is adapted for connection via a conduit to the inlet of the system evaporator as denoted by dashed outline in FIG. 2.

A continuous flow-through passage 40 is formed in the upper portion of block 20 spaced from and oriented generally parallel with ports 38, 28; and, passage 40 is adapted to be connected at one end via a conduit to the inlet of the system compressor and to receive refrigerant discharge via a conduit from the evaporator at the opposite end as shown in dashed lines in FIG. 2.

Referring to FIGS. 1 and 3, a thermally responsive cartridge valve indicated generally at 42 has a valving portion indicated generally at 44 and a fluid filled capsule indicated generally at 46 with the valving portion sized and configured to be received in the bore 22 formed in block portion 20 through the upper end of bore which is open to the top of the block portion 20.

Referring to FIG. 3, cartridge valve 42 has high pressure refrigerant inlet ports 48 formed in the valve portion 44; and, spaced therefrom are provided low pressure discharge ports 50.

Referring to FIG. 2, the inlet ports 48 are isolated from outlet ports 50 by a seal ring 52 provided in the block bore 22; and, the outlet ports 50 of cartridge valve 42 are located or stationed along bore 22 so as to communicate with outlet port 38 of the valve block. The inlet ports 48 of the cartridge valve 42 are disposed in bore 22 below seal ring 52 and thus communicate through the lower end of bore 22 with the interior standpipe 24 which receives refrigerant at a relatively high pressure from the interior of canister 14. The details of the construction and operation of the cartridge valve 42 will be described hereinafter in greater detail. The embodiment of FIGS. 1 through 3, thus provides a unique and relatively low cost technique for assembling a precalibrated thermally responsive cartridge valve assembly 42 into a valve block-header combination after the header has been attached, by weldment, to the system receiver/drier.

Referring to FIGS. 4 through 7, another embodiment of the invention is indicated generally at 60 and has a combination valve block and header indicated generally at 62 formed preferably integrally as one piece, with the header portion 64 received in the open end of a canister 66 and sealed thereon preferably by peripheral weldment 68.

Referring to FIGS. 4 through 7, header 64 has refrigerant received through a high pressure refrigerant inlet port 70 which communicates with the interior of canister 66 and is adapted for connection to a conduit to receive high pressure refrigerant from a condenser as indicated in dashed outline in FIG. 5.

A low pressure discharge port or outlet port 72 is formed on the header diametrically opposite the inlet 70; and, the outlet port 72 is adapted for connection via a conduit to the inlet of the system evaporator as indicated by dashed outline in FIG. 5.

Header portion 64 is preferably formed integrally with a valve block portion 74 of the combination 62 which extends upwardly from the header portion 64 and has a central bore 76 formed therethrough. Header portion 64 has a cross passage 78 formed therein which interconnects discharge port 72 and bore 76 as shown in FIG. 5.

The header portion 64 has a standpipe 80 disposed with the upper end thereof secured in the lower end of bore 76; and, the lower end of the standpipe 80 is disposed closely spaced from the inner surface of the closed lower end of the canister 66.

Canister 66 has provided therein a baffle or porous partition 82 and which may include a layer of screen material. Baffle 82 is spaced from the undersurface of the header 64 to form a plenum chamber 84 which permits high pressure refrigerant entering port 70 to be disbursed over the surface of the baffle for passage therethrough. In the present practice of the invention a second baffle or porous partition 86 is disposed spaced from the plenum baffle 82. The desired amount and type of desiccant and/or filter material as denoted by reference numeral 88 is disposed in the space between baffles 82, 86.

Figure 7:
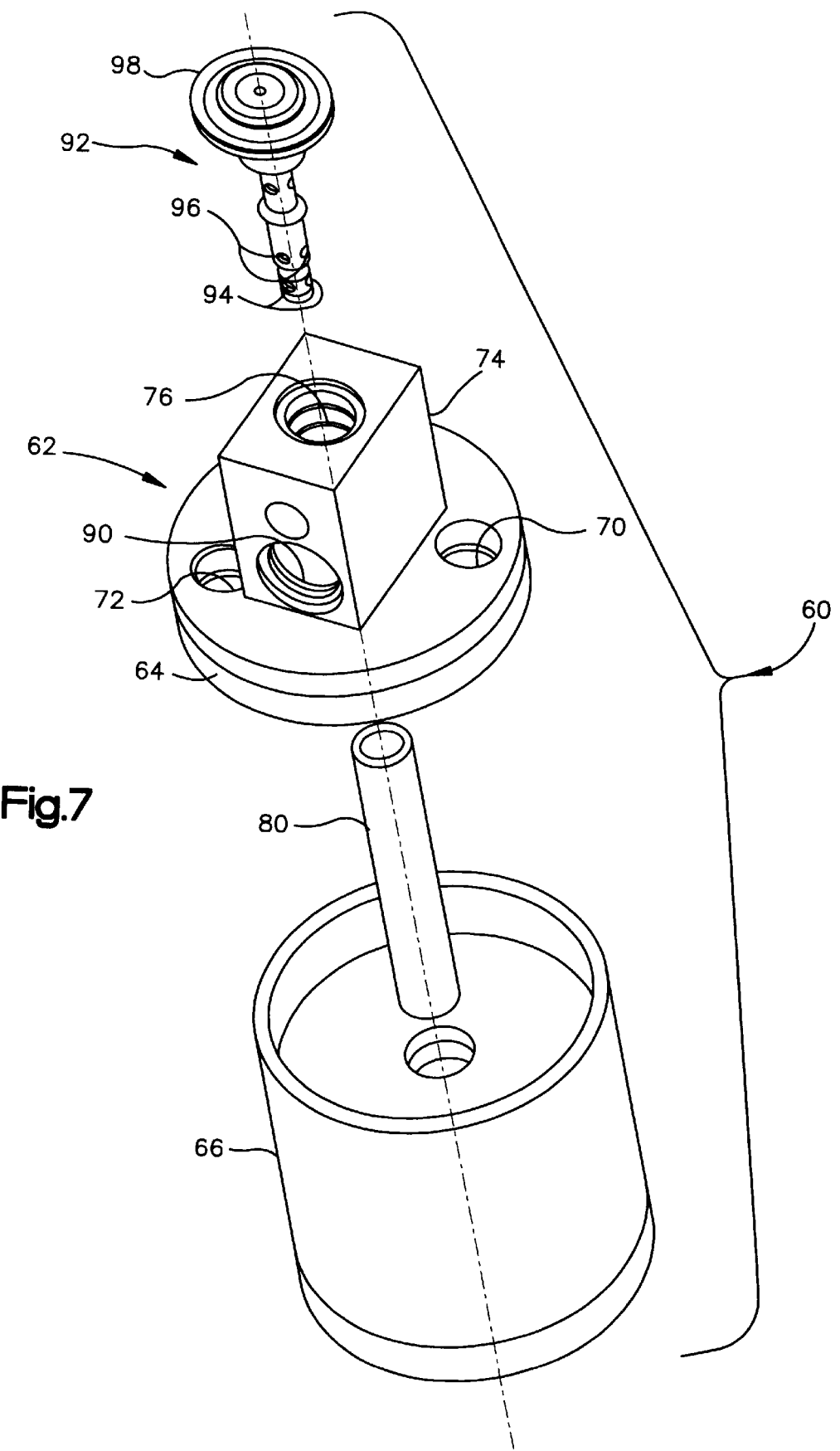
FIG. 7 is an exploded view of the embodiment of FIG. 4.
Figure 8:
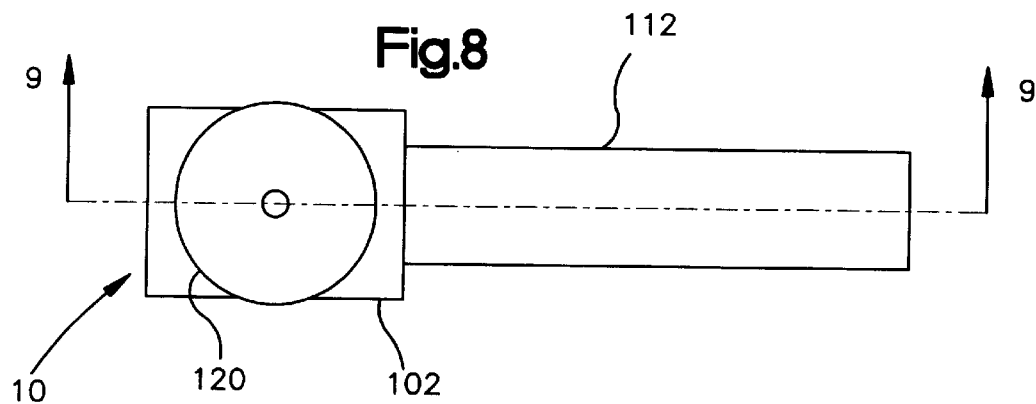
FIG. 8 is a top view of another embodiment of the invention employing a cartridge-type thermal expansion valve in a block with welded tubes.

Referring to FIGS. 5 through 7, the valve block portion 74 has a continuous flow-through passage 90 formed therein disposed in spaced relationship to header portion 64 and at generally right angles to the bore 76 and in communication therewith. Passage 90 is adapted to have one end thereof connected via a conduit to receive vaporized refrigerant discharged from the system evaporator and adapted to have the opposite end connected via a conduit to the suction inlet of the system compressor as indicated in dashed outline in FIG. 6.

A thermally expansive cartridge valve indicated generally at 92 having been previously flow-calibrated is received in the bore 76 and has a plurality of high pressure inlet ports 94 disposed about the lower end thereof. A plurality of low pressure discharge or outlet ports 96 are provided on valve 92 in spaced relationship to the inlet ports 94. The cartridge valve 92 has a fluid filled capsule 98 provided on the upper end thereof which capsule 98 remains external of the valve block upon installation. Upon insertion of the thermal expansion valve 92 into the bore 76, the cartridge valve inlet ports 94 are isolated and sealed from the outlet ports 96 by a suitable o-ring seal 98 disposed in the bore 76. Thus, when the thermal expansion cartridge valve 92 is open, refrigerant flows from inlet 70 through desiccant 88 and up the standpipe 80 and is directed through high pressure inlet ports 94 and is discharged through the ports 96 and cross passage 78 and outlet port 72.

The embodiment of FIGS. 4 through 7, thus provides for an integrally formed thermal expansion valve with a filter/drier in which two of the ports are formed in the filter/drier header and may have conduits attached thereto, as for example by weldment, prior to installation of the precalibrated cartridge thermal expansion valve.

Figure 9:
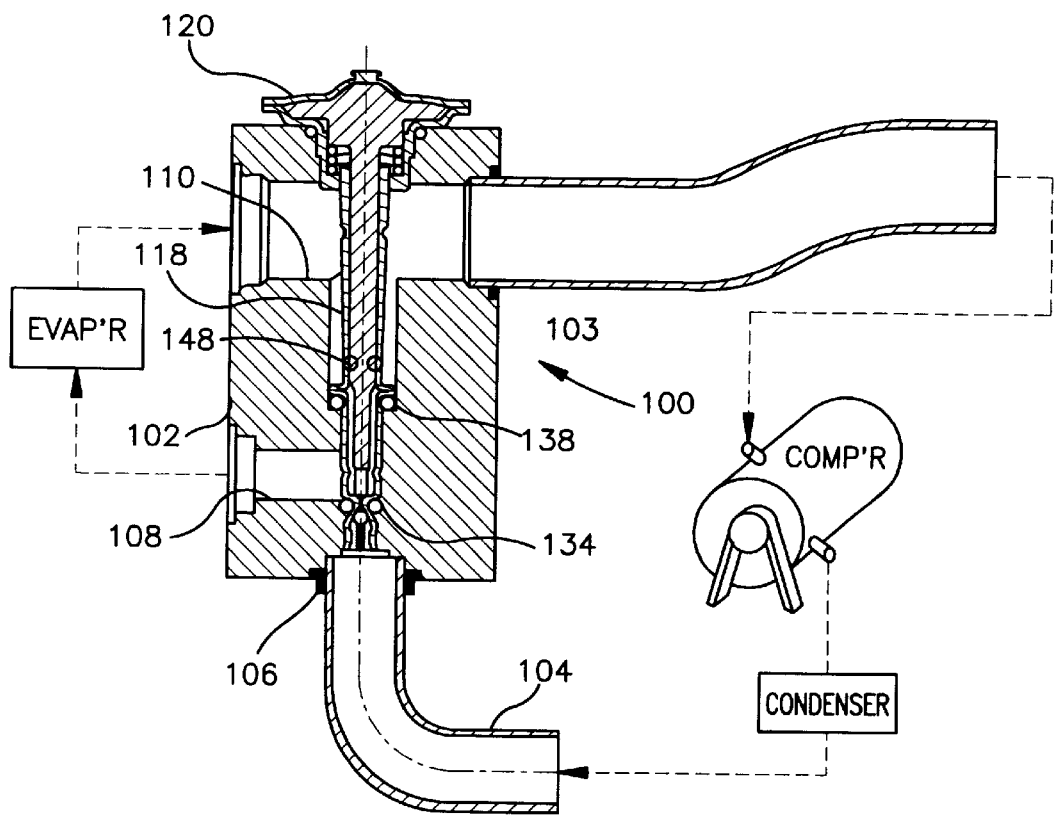
FIG. 9 is a section view taken along section-indicating lines 9—9 of FIG. 8 and shows in dashed outline the connection of the system components to the block ports.

Referring to FIGS. 8 through 11, another embodiment of the invention is indicated generally at 100 and includes a valve block 102 having a central bore 103 formed longitudinally therethrough with one end of a high pressure inlet conduit 104 received in the lower end of the block and communicating with the bore 103. Conduit is secured therein preferably by weldment denoted 106 as shown in FIG. 9; and, conduit 104 is adapted to be connected at its other end to the high pressure refrigerant outlet of the system condenser as shown by dashed line in FIG. 9.

Block 102 has a discharge port or passage 108 formed therein which is disposed generally at right angles to bore 103 and is adapted for connection via a conduit to discharge refrigerant at reduced pressure to the inlet of the system evaporator as shown by dashed outline in FIG. 9.

Figure 11:
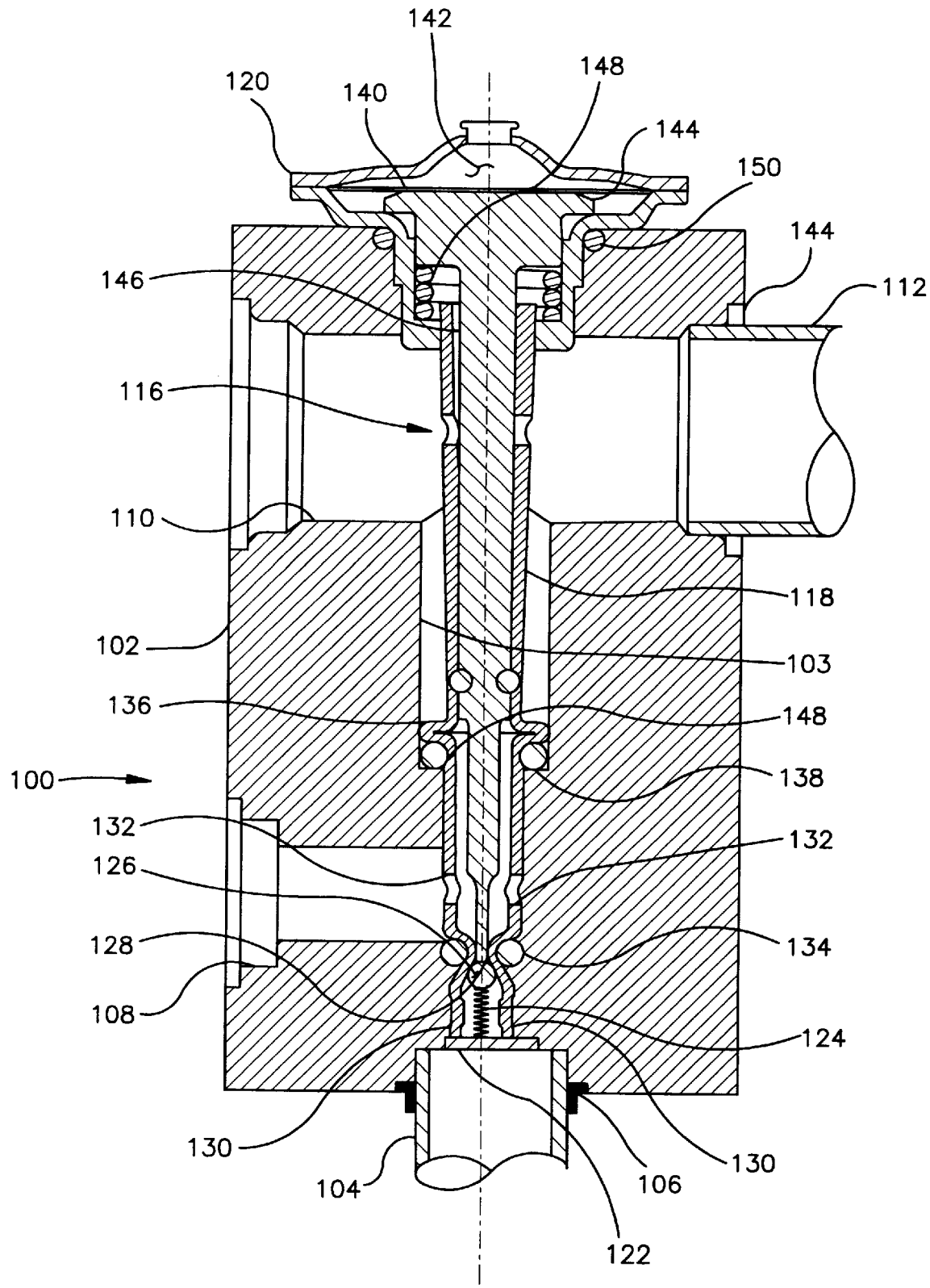
FIG. 11 is a section view of the cartridge type thermal expansion valve of the present invention.

Referring to FIGS. 9 and 11, the valve block 102 has a continuous flow-through passage 110 formed therein disposed in spaced parallel relationship to the outlet 108 and communicating with the bore 103. Passage 110 has one end thereof adapted to receive, via a conduit, refrigerant discharge from the system evaporator as indicated in dashed outline in FIG. 9; and, the other end of passage 110 has received therein a conduit 112 which is secured therein by weldment as denoted by reference numeral 114. Conduit 112 is adapted to be connected via a hose to the compressor inlet as indicated by dashed line in FIG. 9.

Figure 10:
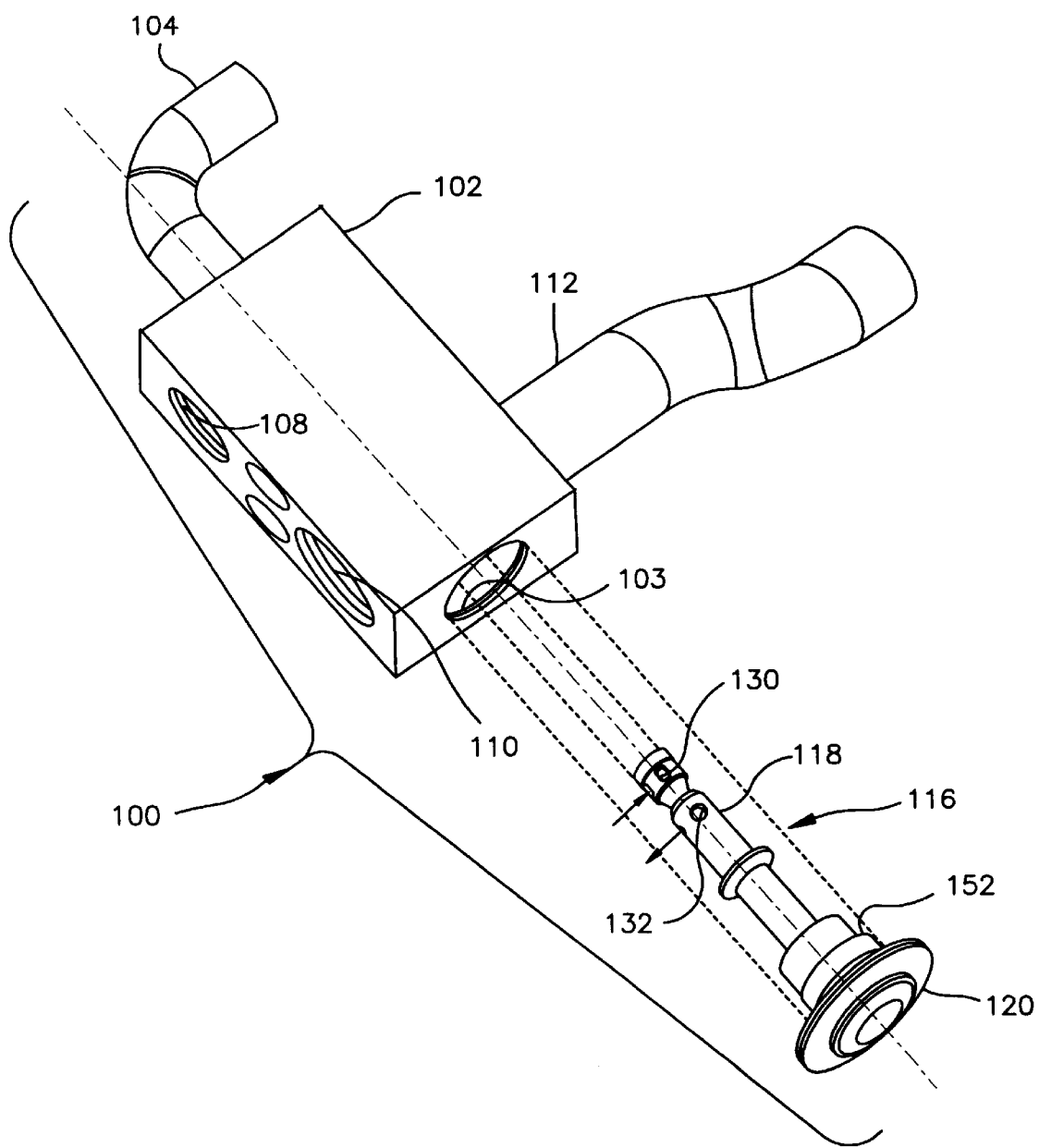
FIG. 10 is an exploded view of the embodiment of FIG. 9.

Referring to FIGS. 9 through 11, a cartridge type, self-contained thermal expansion valve indicated generally at 116 is provided, which has a valving tube 118 connected to a fluid filled capsule 120. The valving tube 118 has the lower end thereof closed by a retainer 122 which has registered thereagainst one end of a spring 124 which has the opposite end urging a valve obturator member 126 in contact with a valve seat 128 formed, preferably integrally, on the interior of the tubing 118. The valving tube 118 has a plurality of high pressure inlet ports 130 formed therein between the valve seat and the end cap 122. A plurality of reduced pressure outlet ports 132 are formed about the tube 118 on the opposite side of valve seat 130, it being understood that flow occurs over the valve seat only when the obturator 126 is lifted therefrom to permit flow from inlet ports 130 to outlet ports 132. When the cartridge valve 116 is received in the bore 103 in valve block 20, a ceiling ring or o-ring 134 is provided thereabout, and seals about the exterior of the tube 118 in the region of the valve seat 128 and isolates the inlet ports 130 from the outlet ports 132.

Referring to FIGS. 9 and 11, the outlet ports 132 are disposed to communicate with the upper portion of bore 103 and the outlet passage 108 formed in the valve block 20. Valving tube 118 has a convolution or annular flange 136 formed thereabout which registers against a second seal ring 138 provided in the bore 103 to seal off the outlet passages 128 from the flow-through passage 110.

The fluid filled capsule 120 has a diaphragm 140 which retains the fluid fill 142 in the capsule 120. It will be understood that changes in the temperature of the fluid 142 effect movement of diaphragm 140 which acts against the enlarged upper end 144 of an operating rod 146. Rod extends downwardly through tube 118 and has its lower end reduced in diameter so as to pass through valve seat 128 and contact the obturator 126 and effect movement thereof from the valve seat to permit flow between the inlet ports 130 and outlet ports 132. As is well known in the art, fluid flowing through passage 110 transfers heat through rod 146 to diaphragm 140 thereby maintaining the temperature of the fluid 142 at about the same temperature as the fluid flowing in passage 110 thereby causing the valve 116 to control the flow to the evaporator discharge passage 108 in response to changes in the temperature of the fluid returning from the evaporator through passage 110.

A return spring 148 maintains the upper end of the rod 144 against the diaphragm 140. The capsule 120 is sealed in the valve block by an o-ring 150; and, the thermal expansion valve 116 is retained in the valve block 102 by threads 152 provided on the lower portion of the capsule 120 which engage corresponding threads in the upper end of bore 103.

It will be understood that the thermal expansion valve 116 of the embodiment 100 is assembled, filled with fluid, and calibrated for flow in response to temperature changes in a suitable fixture (not shown) prior to assembly into the block 102. This permits the welding of the tubes 104, 112 into the body to be performed as a separate operation and the thermal expansion valve inserted into the body as a unit after the welding operations are completed. Thus the thermal expansion valve is not exposed to the elevated temperatures experienced by the block during welding. This is particularly significant where the valve block 102 is formed of aluminum and thus is raised to substantially higher temperatures during welding than the thermal expansion valve will experience during its service life.

The welding of the conduits 104, 112 to the valve block thus permits the conduits to be pre-formed with any desirable type of connector on the remote ends thereof and the conduits configured as required, for example to have flexible hoses connected thereto, to simplify the installation of the thermal expansion valve and block in a vehicle during assembly thereof.

Although the invention has hereinabove been described with respect to the illustrated embodiments, it will be understood that the invention is capable of modification and variation and is limited only by the following claims.

What is claimed is:

1. A filter/drier assembly with integral expansion valve for use in a refrigerant system comprising:
   (a) a header having a first portion with an inlet passage therethrough and a second portion with an outlet passage, said second portion having an expansion valve received in said outlet passage;
   (b) a canister attached to said header first portion with said first portion extending outwardly of said canister and having a plenum therein communicating with said inlet passage, said canister containing at least one of desiccant material and filter material disposed such that refrigerant flow into said plenum flows through said at least one material to said outlet passage wherein said expansion valve is operative to control flow from said canister to said outlet passage, wherein said outlet passage is adapted for connection to an evaporator inlet and said inlet passage is adapted for connection to a condenser outlet.

2. The assembly defined in claim 1, wherein said header first portion includes a thermally actuated expansion valve received in said outlet passage.

3. The assembly defined in claim 1, wherein said header first portion has relatively large transverse section and said second portion has a relatively reduced transverse section.

4. The assembly defined in claim 1, wherein said canister has both said filter material and desiccant material therein.

5. The assembly defined in claim 1, wherein said canister has a standpipe thereon communicating with said outlet passage.

6. The assembly defined in claim 1, wherein said canister is secured to said header first portion by weldment.

7. The assembly defined in claim 1, wherein said header first and second portion are integrally formed as a pole piece member.

8. A method of making a filter/drier with integral expansion valve for use in a refrigerant system comprising:
   (a) forming a header having a first portion having an inlet passage therethrough and a second portion having an outlet passage therethrough;
   (b) disposing at least one of desiccant and filter material in a canister and defining a plenum therein and attaching said canister to said header first portion and communicating said inlet passage with said plenum;
   (c) directing refrigerant flow from said plenum through said at least one material to said outlet passage; and,
   (d) disposing an expansion valve in said header second portion and controlling flow from said inlet passage to said outlet passage.

9. The method defined in claim 8, wherein said step of disposing at least one material includes disposing both desiccant and filter material.

10. The method defined in claim 8, wherein said step of attaching said canister comprises securing said canister to said header by weldment.

11. The method defined in claim 8, wherein said step of disposing an expansion valve includes disposing a thermally actuated valve in said outlet passage.

12. The method defined in claim 8, wherein said step of forming a header comprises forming said first and second portions integrally as a one piece member.

13. The method defined in claim 8, wherein said step of directing refrigerant flow includes disposing a standpipe in said canister and connecting said standpipe to said outlet passage; and, passing said standpipe through said at least one material.

14. A method of making a refrigerant expansion valve comprising:
   (a) forming a valving cavity in a valve block and forming an inlet port and a separate outlet port in said cavity;
   (b) forming a continuous passage through said block, said passage communicating with said cavity;
   (c) attaching one end of a first conduit to one end of said continuous passage by weldment;
   (d) attaching one end of a second conduit to said inlet port by weldment;
   (e) providing a thermally responsive valve cartridge having a high pressure inlet, a moveable valve obturator and a reduced pressure outlet and pre-calibrating said cartridge valve for controlling flow between said high pressure inlet and reduced pressure outlet in response to sensed temperature; and,
   (f) inserting said valve cartridge in said valving cavity and simultaneously isolating said reduced pressure outlet from said high pressure inlet.

15. The method defined in claim 14, wherein said step of providing a valve cartridge includes providing a fluid filled capsule having a portion of the capsule moveable in response to changes in sensed temperature of the fluid and moving said obturator in response to said sensed temperature.

16. The method defined in claim 14, wherein said step of forming a continuous passage includes forming said passage at right angles to said cavity.

17. The method defined in claim 14, wherein said step of inserting includes communicating said valve cartridge high pressure inlet with said block inlet port; and, communicating said valve cartridge reduced pressure outlet with said block outlet port.

18. The method defined in claim 14, wherein said step of providing a valve cartridge includes providing a fluid filled capsule and moving an operating member in response to changes in the temperature of the fluid in said capsule and moving said obturator.

19. The method defined in claim 14, wherein at least one of said step of attaching said first conduit and said step of attaching one end of said second conduit includes brazing.

20. The method defined in claim 14, wherein said step of forming a valving cavity includes forming a bore in one end of a block; and, said step of forming an inlet port includes forming a bore in the end of said block opposite said cavity.

21. The method defined in claim 14, wherein said step of forming an outlet port includes forming a bore at right angles to said inlet port.

* * * * *